(12) United States Patent
Val et al.

(10) Patent No.: US 6,898,571 B1
(45) Date of Patent: May 24, 2005

(54) ADVERTISING ENHANCEMENT USING THE INTERNET

(75) Inventors: Jordan Du Val, Santa Clara, CA (US); Derek Noonburg, San Jose, CA (US)

(73) Assignee: Jordan Duvac, Sunnyvale, CA (US)

( * ) Notice: Subject to any disclaimer, the term of this patent is extended or adjusted under 35 U.S.C. 154(b) by 204 days.

(21) Appl. No.: 09/685,975

(22) Filed: Oct. 10, 2000

(51) Int. Cl.[7] .............................................. G06F 17/60
(52) U.S. Cl. ...................................................... 705/14
(58) Field of Search ................................ 705/1, 10, 14

(56) References Cited

U.S. PATENT DOCUMENTS

| | | | | |
|---|---|---|---|---|
| 5,515,270 A | * | 5/1996 | Weinblatt | 364/405 |
| 5,933,811 A | * | 8/1999 | Angles et al. | 705/14 |
| 5,937,037 A | * | 8/1999 | Kamel et al. | 379/88.19 |
| 5,937,392 A | * | 8/1999 | Alberts | 705/14 |
| 5,948,061 A | * | 9/1999 | Merriman et al. | 709/219 |
| 5,970,469 A | * | 10/1999 | Scroggie et al. | 705/14 |
| 5,974,451 A | * | 10/1999 | Simmons | 709/218 |
| 6,246,994 B1 | * | 6/2001 | Wolven et al. | 705/14 |
| 6,351,442 B1 | * | 2/2002 | Tagawa et al. | 369/53.41 |

FOREIGN PATENT DOCUMENTS

WO  WO 96/33561  * 10/1996  ............... 705/14 X

OTHER PUBLICATIONS

Online Advertising from Interactive Content; No. 12, May 1, 1996.*
Lamar Graham, "Parade Lets Cat Out of Bag", Parade Magazine, Aug. 27, 2000, p. 16.

* cited by examiner

Primary Examiner—Stephen Gravini
(74) Attorney, Agent, or Firm—Brian Ogonowski

(57) ABSTRACT

A technique for providing enhanced advertising over the Internet or an intranet is disclosed. In one embodiment, an advertiser advertises a product or service in the usual manner except that an alphanumeric code is identified in the advertisement. The consumer, desiring additional information regarding the advertisement, uses the Internet to log onto a particular website common to all the advertisers (the service provider's website) and then enters the code for the ad. The particular code then accesses an enhanced ad (a web page) that may be specifically directed to a particular geographic location or otherwise customized for the particular consumer. The enhanced ad may allow the customer to obtain coupons, purchase the product or obtain additional information.

1 Claim, 4 Drawing Sheets

ADVERTISING ENHANCEMENT USING THE INTERNET

FIELD OF THE INVENTION

This invention relates to a technique for presenting advertising to potential customers and, in particular, to a technique for presenting advertising over the Internet.

BACKGROUND

Advertising, such as in newspapers, radio, television, and over the Internet, is limited due to price, space, and time limitations, depending on the particular medium being used. Frequently, consumers desire additional information regarding the advertised product or service, and the consumer must devise ways to find out more about the advertised product or service.

What is needed is a simple technique to allow consumers to obtain more information about advertised products or services. What is also needed is a technique to allow advertisers to provide advertising particularly suitable for a certain type of consumer, such as those within a certain geographic area or those desiring specific attributes in an ad, such as providing coupons or allowing for an on-line sale of the product. Such a service would enhance the sales of the advertised product or service, provide increased consumer satisfaction, and provide a revenue stream for the provider of such a service.

SUMMARY

A technique for providing enhanced advertising over the Internet or an intranet is disclosed. In one embodiment, an advertiser advertises a product or service in the usual manner except that an alphanumeric code is identified in the advertisement. The consumer, desiring additional information regarding the advertisement, uses the Internet to log onto a particular website common to all the advertisers (the service provider's website) and then enters the code for the ad. The particular code then accesses an enhanced ad that may be specifically directed to a particular geographic location or otherwise customized for the particular consumer.

In one embodiment, consumers who use the website identify personal preferences for ad enhancements, such as providing coupons, providing certain levels of detail, or providing other features. When the consumer subsequently logs onto the website, the provider's server can identify the consumer by detecting a "cookie" in the consumer's computer, allowing the service provider to then identify the desired enhancements previously selected by the consumer.

The enhanced ad will typically be in the form of a web page sent by the provider's server to the consumer's computer using a web browser.

The ad may contain interactive features, such as allowing the user to select coupons or make a purchase directly from the web page. A coupon would be printed by the consumer's printer or sent to the consumer.

The service provider may receive income from the advertiser or from the owner of the medium that initially displayed the ad containing the code, and revenues may be based upon the traffic for a particular ad or upon any other criteria. Additional features of the system are described herein.

BRIEF DESCRIPTIONS OF THE DRAWINGS

DETAILED DESCRIPTION

Figure 1:
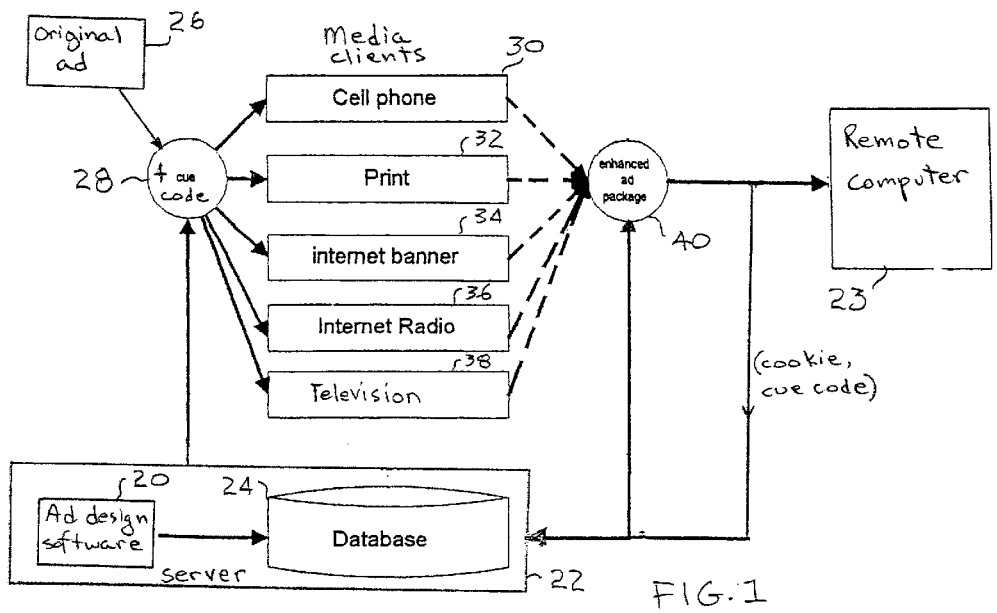
FIG. 1 is a conceptual diagram of the various functional and hardware blocks comprising a system in accordance with one embodiment of the invention.
Figure 2:
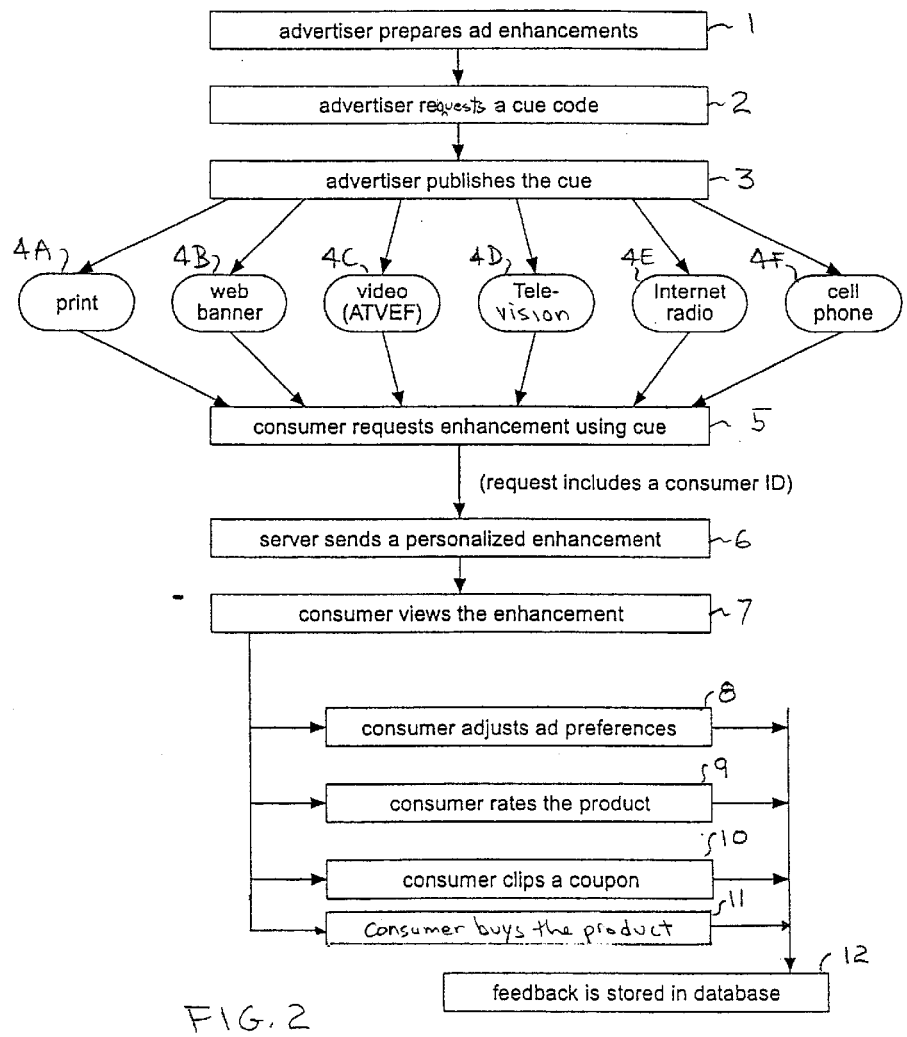
FIG. 2 is a flowchart illustrating a method in accordance with one embodiment of the invention.

FIG. 1 illustrates the various functional and hardware components of one embodiment of the present invention. FIG. 2 is a flowchart illustrating steps carried out by the system of FIG. 1. The system allows the advertiser to include a cue code printed in an ad, or, if the ad is electronically transmitted such as to a cell phone, radio, or television, the cue code may be embedded within the transmitted signal itself and decoded using a suitable decoder to display the cue code. The consumer who is interested in obtaining more information about the advertised product or service uses the cue code to access an enhanced ad over the Internet. The enhanced ad may be customized for a particular geographic area. More detail is presented below.

In step 1 of FIG. 2, the advertiser initially prepares ad enhancements to be accessed by the consumer's web browser via the Internet. This ad enhancement will typically be a web page that may or may not be interactive. An interactive web page may allow the consumer to purchase the product, obtain coupons, link to another web site, or obtain a brochure or sample. The advertiser may prepare these ad enhancements using well-known software (e.g., HTML code) pertaining to generating a web page. In one embodiment, the service provider for the system of FIG. 1 provides a website that allows the advertiser to download web page design software 20 (FIG. 1) to allow the advertiser to prepare an ad enhancement. Such an ad enhancement may also be designed by the service provider itself.

The advertiser prepares a set of one or more enhancements (web pages) for each product. The enhancements show the appropriate information for a given product(s). The enhancements may target different geographic regions and consumer preferences. For example, the geographic regions may divided into countries, states, or regions so as to provide the consumer only the information that the consumer needs, such as local stores for purchasing the product. Of course, the same ad enhancement may be used for all geographic regions if appropriate. In addition, enhancements are tagged with a preference. Examples of consumer preferences for ads are:

Buy type—targeting consumers who simply want to know how to buy the product and, optionally, offering on-line ordering of the product;

Inform type—targeting consumers who are interested in getting more detailed information on the product;

Entertain type—targeting consumers who want to be entertained by the ad enhancement.

Additional preferences may be chosen.

In one example, an advertiser might provide the following enhancements:

Covering the Eastern U.S., all preferences.
Covering the Western U.S. except California, entertain preference.
Covering the Western U.S. except California, buy and inform preferences.
Covering California, buy preference.
Covering California, inform and entertain preferences.

A consumer may have pre-selected any one of the above enhancements depending upon the consumer's geographic location and preferences. Each of the enhancements would be a separate web page with ever information the advertiser wants to convey to consumers in the covered region and with the specified preference. In order to choose an enhancement for a specific consumer, the web server 22 first looks up the consumer's geographic location and preferences in a database 24. This may be done by the server 22 looking at a "cookie" in the consumer's computer 23 that identifies the consumer and allows the server 22 to then cross-reference the consumer identification with the geographic location and preferences that the consumer had previously identified. The server 22 chooses the ad that matches the consumer's preference for that type of product (e.g., food) or for that specific product (e.g., Joe's Pizza). For example, the consumer may always wish to obtain a coupon for any restaurants advertised and, thus, the enhanced ad for a particular restaurant would include coupons or other discounts.

The advertising enhancements are also stored in the database 24 in FIG. 1 for access by the consumer's web browser.

In step 2 of FIG. 2, the advertiser requests a cue code from the server provider. A cue code is simply an identification code, such as an alpha-numeric code, that is uniquely associated with an ad enhancement (web page) stored in the database 24. The advertiser requests the cue code from the service provider by logging onto a website and selecting a cue code that has not yet been assigned. In one embodiment, a descriptive prefix is assigned to each product, and then consecutive numbers are allocated to each enhanced ad for that product. This will make the cue codes more easily remembered. One advantage to having multiple cue codes for the same product is that usage statistics can be tracked for each code. For example, an advertiser might want to publish a different code in each of several newspapers and yet more codes on various web banner ads, etc. A consumer may get the same ad enhancement regardless of which cue code he uses, but multiple cue codes for the same ad enhancement may be used to identify the source of the cue code (e.g., a particular newspaper) so that the advertiser can track which ads are producing the most hits. The service provider counts the number of accesses of each code so the advertiser can judge the effectiveness of each published ad.

In step 3 of FIG. 2, the advertiser publishes the cue code using any type of media. The published cue code will typically accompany the original ad for the product or service. FIG. 1 identifies the original ad 26 and the cue code 28 being associated with the ad.

If the original ad 26 is published in print, the cue code may be displayed using a particular icon followed by the cue code in a predictable location with respect to the printed ad. A print cue consists of a cue code printed together with the service provider's URL. Consumers use this type of cue code by going to the service provider's web page and manually typing in the code. Or, the cue code can be part of the URL itself so the enhanced ad is directly accessed.

For advertisements that are electronically transmitted, the advertiser has the option of orally or visually conveying the cue code or embedding the cue code in a hidden signal. Such a hidden signal may be transmitted during the vertical blanking period within a televised signal or a code transmitted during an Internet radio broadcast or during any other communication. These embedded codes are then decoded by a conventional decoder, such as an ATVEF decoder, and the decoded cue code may then be displayed on a computer monitor or on a television screen. Further information about ATVEF codes may be obtained from the Internet, and such information is incorporated herein by reference.

FIG. 1 illustrates various examples of media which can accommodate the original ad and the cue code (or simply the cue code by itself). These media include a cell phone 30 having a display and a wireless Internet connection, any printed medium 32, such as a newspaper, magazine, or billboard, an Internet banner 34 or other ad displayed via the Internet on a computer screen, Internet radio 36, or a television signal 38. Web banner ads already contain hyperlinks. The service provides a special URL format so that any web hyperlink can be a code cue. The link might look something like 'http://www.spotnet.com/fetch?code=xyz123', where 'xyz123' is replaced with the cue code to be used. Consumers use this type of cue by simply clicking on the banner.

In one embodiment, the television is used in conjunction with a home computer, wherein the home computer communicates with a server via the Internet to obtain additional information about television programming that is being broadcast. The server receives any ATVEF signals in the television broadcast and transmits the ATVEF decoded signal, typically a URL address, to the consumer's computer via the Internet. The consumer can then click on or otherwise enter the URL code to access an advertiser's web page. Additional detail of this interaction between a television and a computer can be found in U.S. application Ser. No. 09/585,266, filed May 30, 2000, entitled "Personal Computer Used In Conjunction With Television To Display Information Related To Television Programming," assigned to the present assignee and incorporated herein by reference.

In FIG. 2, publishing the cue code with or without the ad in the various media is shown as steps 4A–4F.

In FIG. 1, the enhanced ad associated with the published ad's cue code is identified as an enhanced ad package 40, stored in the database 24.

In step 5 of FIG. 2, the consumer who has viewed the ad from any of steps 4A–4F and who is interested in additional information about the advertised product requests the ad enhancement using the cue code. This may be done in a variety of ways. In one embodiment, the consumer uses a web browser to set up a link with the service provider's website and then enters the cue code (a URL) by clicking on icons or using a keypad. Enhancements are simply web pages. The URL can take slightly different forms, as described above. The URL may be a direct link (e.g., web banners), or it may be encoded (e.g., ATVEF signals), or it may require the extra step of typing a cue code into a web form. In all of these cases, the consumer ends up requesting a specific URL (which embeds the service provider's cue code) from the service provider's web server.

The consumer's computer and web browser software are identified in FIG. 1 as computer 23.

Figure 3:
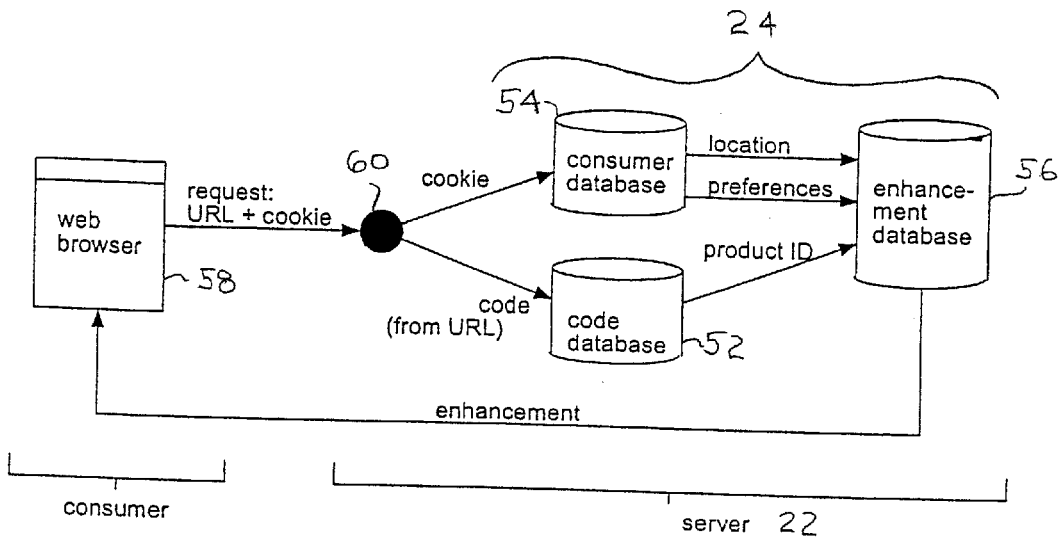
FIG. 3 illustrates the software and database functional units for one embodiment of the invention.

In step 6 in FIG. 2, the server 22 sends the personalized enhancement (web page) associated with the cue code to the consumer. FIG. 3 illustrates various functional units and databases associated with steps 5 and 6 of FIG.2.

There are three main databases in the service provider's system:

1. Consumer: This database 54 lists all of the consumers who have registered with the system. It is indexed by consumer ID. For each consumer, it contains:

the consumer's geographical location, used to localize ad enhancements (this information is derived from a zipcode supplied by the consumer when signing up for the account)

the consumer's name, address, and other information used to personalize ad enhancements the consumer's preferences, listed by product or product genre the consumer's ratings, listed by product a list of coupons clipped by the consumer 2. Service provider codes: This database 52 maps the service provider's cue codes to product IDs, i.e., it contains a list of the codes associated with each product.

3. Enhancements: This database 56 maps product ID/location/preference into an enhancement. It is used to figure out which web page to send back when a consumer makes a request for an ad enhancement for a specific product. The consumer requests an enhancement by requesting a URL via a web browser 58. The web server 22 responds by following these steps:

1. It extracts the cue code from the requested URL.
2. It uses the code as a database key for product database 52 and looks up the associated product ID.
3. It looks for the consumer's cookie. This is a standard web cookie, initially issued by the web server and subsequently sent by the consumer's web browser with every request to the web server. The cookie provides a consumer ID which is used as an index in the consumer database 54. If the cookie is not present, the consumer is presented with a sign-up page, and they are required to establish an account before they can get the requested enhancement. As part of setting up the account, the server issues a cookie containing the consumer ID to be stored in the consumer's computer by the browser.
4. It uses the consumer ID as a database key and looks up that specific consumer's geographic location and any available preference information (if the consumer previously indicated a preference for the product or the product genre).
5. Using the geographic location and the preference information, it chooses a specific enhancement from the set of enhancements in database 56 for this product.
6. It transmits the enhancement web page to the consumer's web browser.

In step 7 of FIG. 2, the consumer views the enhancement. The enhancements are normal web pages and can be viewed using any web browser. Enhancements can contain any content allowed by standard web browsers, including images, streaming video, etc.

A feature on each enhancement web page allows the consumer to indicate their preferences on this product or product genre. As previously described, the current system allows three different preferences: buy, inform, and entertain. In step 8 of FIG. 2, the consumer can choose one of these three preferences by clicking the corresponding button on the web page. The server will save this information for use the next time this consumer requests an ad enhancement for this product or product genre. This system is extendable to handle any number of preferences.

Another feature on each enhancement allows the consumer to rate a product (step 9). For example, the ratings might range from 1 to 5, with 1 meaning 'completely uninterested' and 5 meaning 'looks great'. As with preferences, the ratings are sent back to the server. Ratings from all consumers in the database are combined to predict each consumer's interest in new advertiser campaigns.

Figure 4:
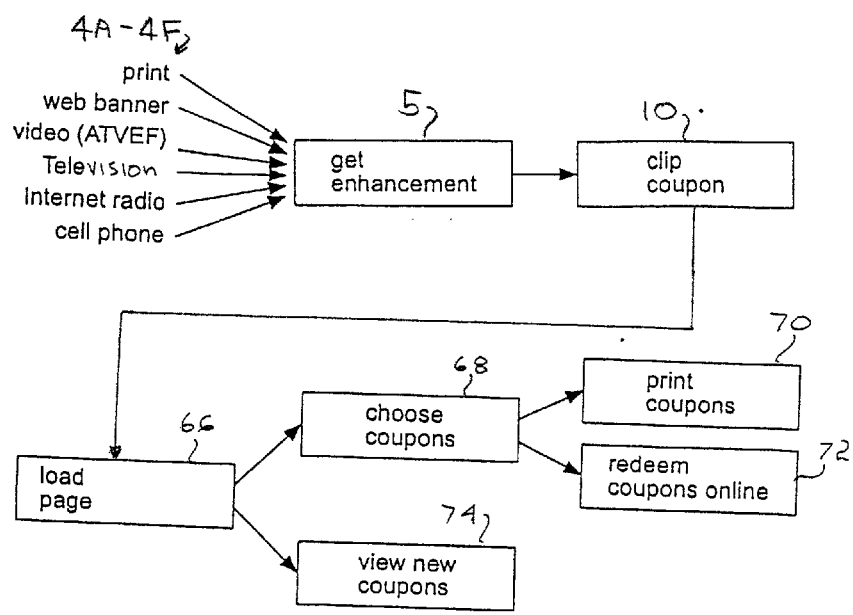
FIG. 4 is a flowchart of certain steps in FIG. 2.

In step 10, the consumer may 'clip' a coupon for the product. FIG. 4 is a flowchart showing various additional steps for using the coupon feature. If an enhancement includes a coupon (as part of web page), the consumer can 'clip' the coupon and save it to his personal account in the service provider's system. This allows him to view the enhancements on a device that doesn't allow printing (e.g., a set top box) and later print the coupons using any PC with an Internet connection.

Each registered consumer has a web page provided by the service provider. A consumer's page is his interface to the consumer database. From his page (step 66), a consumer can:

1. Print selected coupons (steps 68, 70). The system provides a web page containing the selected coupons, and the consumer is expected to use the print feature of his browser to print them. Once they are successfully printed, they may be removed from his account.
2. Redeem selected coupons online (steps 68, 72). This is handled via partnerships with online retailers. For example, to redeem grocery coupons, the system transfers (over the Internet) the selected coupons to the chosen online grocer. The consumer is provided with a web link that takes them straight to the online grocer's website, with the selected products preloaded into the online 'shopping cart'.
3. Examine new coupons issued by advertisers (step 74). The system uses the consumer's past rating of other products in combination with other consumer's ratings to predict ratings for the new products ('collaborative filtering'). These predicted ratings are used to sort the new coupon list, moving coupons in which the consumer is most likely to be interested to the top of the list.

In step 11, the consumer may purchase the product on-line by providing his credit card information.

In step 12, all the consumers commands and feedback are stored in the database 24 for future reference.

Figure 5:
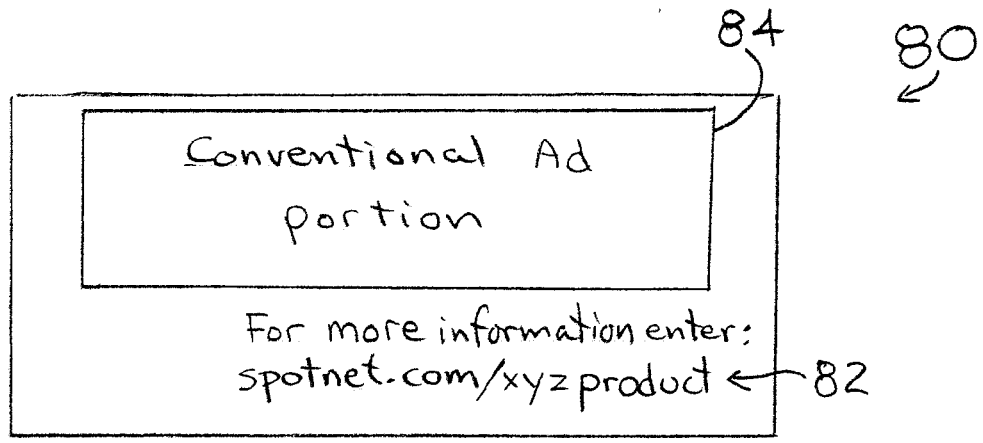
FIG. 5 illustrates a printed advertisement which is conventional except for a cue code that is used by the consumer to obtain enhanced advertisements.
Figure 6:
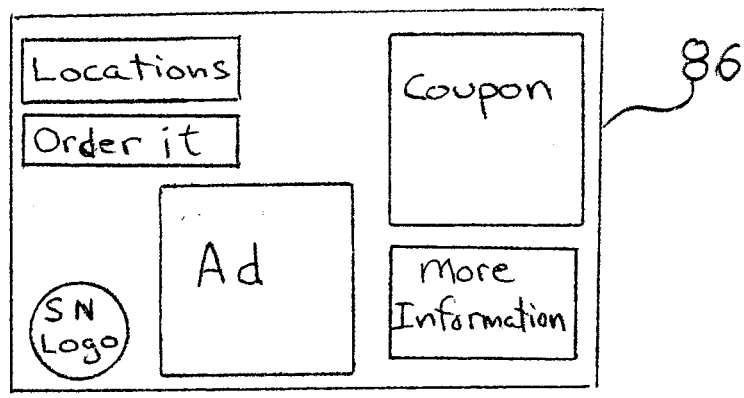
FIG. 6 is an example of an enhanced advertisement (a web page) displayed to the consumer via the Internet after entering the cue code from FIG. 5.

FIG. 5 is an example of a printed advertisement 80, such as a billboard or magazine ad, identifying a cue code 82 for use in obtaining an enhanced ad. The ad 80 includes a conventional portion 84 along with the cue code 82. In one embodiment, the cue code contains the service provider's name (e.g., SpotNet) along with a code that identifies the advertised product or service. When the consumer enters the cue code using a web browser, an enhanced ad 86 (FIG. 6) will be displayed on the computer monitor. The enhanced ad 86 has various attributes specifically requested by the consumer. Such attributes include on-line ordering information, coupons, geographically-specific information, and other information. The cookie or other consumer identifier is automatically read by the service provider's server to retrieve a particular ad from the server's database based on the attributes previously requested by the consumer for enhanced ads.

Figure 7:
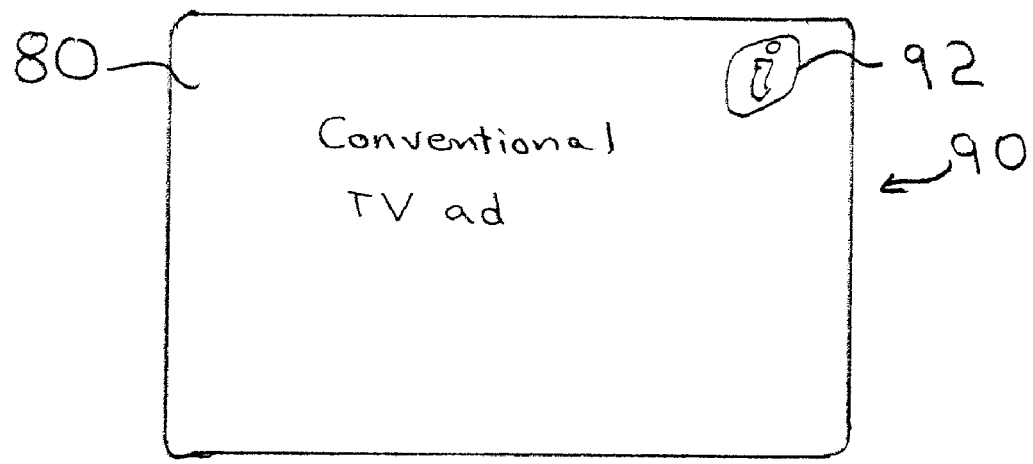
FIG. 7 illustrates a televised advertisement which is conventional except for a cue code icon that is used by the consumer to obtain enhanced advertisements.
Figure 8:
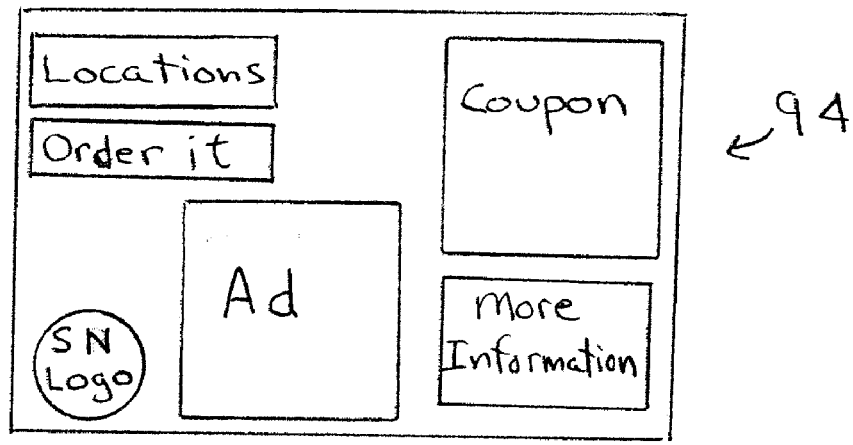
FIG. 8 is an example of an enhanced advertisement (a web page) displayed to the consumer via the Internet after entering the cue code from FIG. 7.

FIG. 7 is an example of a television ad 90, where a set-top box detects an ATVEF signal and displays an icon 92. In one embodiment, upon "clicking on" the icon with a remote control, a computer program automatically enters the cue code designated by the ATVEF signal to access the service provider's server. The enhanced ad (a web page) will have the attributes previously requested by the consumer. The web page 94 displayed in FIG. 8 may be identical to that for the printed ad of FIG. 5 for the same product.

In another embodiment, the consumer's computer may access the service provider's website during the television broadcast and display key words or an icon that tracks the ATVEF information. In such an embodiment, a set-top box is not needed to detect the ATVEF signal and display the icon. If the consumer clicks on the key word or icon, the enhanced ad (FIG. 8) for the product will be accessed.

In addition to the consumer's personal preference for the ad enhancement, an ad enhancement may additionally be chosen based on the display device for the web page, such as a personal computer, a cell phone, a PDA, or Web TV. Such a preference may be selected by the consumer or the selection may be automatic based on the signal received by the server.

The invention may be applied to other than advertisements. For example, a cue code may be associated with any item of possible interest such as entertainment. The enhanced ad may be accessed over any communication system in addition to the Internet, such as an intranet (e.g., communication over an Ethernet).

While particular embodiments of the present invention have been shown and described, it will be obvious to those skilled in the art that changes and modifications may be made without departing from this invention in its broader aspects and, therefore, the appended claims are to encompass within their scope the true spirit and scope of this invention.

What is claimed is:

1. A method of consumer advertising comprising:

electronically transmitting a product or service advertisement online or by network communications, wherein said advertisement contains a cue code embedded in an advertisement transmission, said cue code containing customized enhanced advertisement information including consumer demographic geographic or consumer demographic preference information with respect to a product or service;

identifying, by way of a web server, said demographic information of a consumer selected advertisement matching consumer information such that a discount incentive is presented to a consumer, wherein said consumer information is generated from computer browser stored information operated by said consumer;

advertiser selecting said cue code from a server provider, which uniquely associates a database stored advertisement enhancement used for online transmission, wherein said server provider counts a number of code access requests such that an advertiser is able to determine numeric effectiveness of a published advertisement;

publishing said advertisement, accompanying said cue code such that an original advertisement and cue code are associated with said advertisement, wherein said cue code is embedded with a service provider URL or wherein said cue code is embedded in encoded format for decoded display;

sending a personalized enhancement, associated with said cue code of said consumer from a service provide system, wherein said service provider system further comprises main databases including a consumer database, listing consumers registering with said system, wherein said consumer database contains:

consumer geographical location to localize advertisement enhancements, consumer name, address, and identifying information to personalize advertisement enhancements, consumer preferences listed by product or product genre, consumer ratings listed by product, consumer utilized coupon discount incentives, a service provider code database, mapping service provider cue codes, providing product identification associated with said product;

an enhancement database, mapping product identification, location, and preference into said enhancement advertisement, wherein a consumer request for enhancement allows a web server to extract said cue code, uses said code as a database key for an associated product identification, seeks said consumer demographic information, wherein if said consumer demographic information is unavailable, requiring an account establishment such that consumer identification information is stored as said consumer computer browser stored information, uses consumer identification information as a database key for retrieval of a specific consumer geographical information or a preference information, uses said geographical information and said preference information to select a specific advertisement enhancement from a set of database enhancements, and transmits said advertisement enhancement from a server to a consumer browser;

wherein said preferences include any one of buy, inform, and entertain selections, such that said selections will be used for subsequent advertisement enhancement requests;

interfacing a consumer page provided by said service provider, wherein a consumer prints selected discount incentives, which are removed from a consumer account print eligibility status when printed, redeem selected discount incentives online allowing a direct link for online redemption, examine new discount incentives issued by advertisers by using consumer past and predicted product ratings, for sorting and prioritizing new discount incentives;

allowing printed advertisement cue code information to be entered onto a web browser for online enhanced advertisement display; and allowing television broadcast cue code information to be entered onto a web browser for online enhanced advertisement display.

* * * * *